March 1, 1949.  M. M. MARISIC  2,463,467
PREPARATION OF SPHEROIDAL AEROGEL PELLETS
Filed Sept. 8, 1945
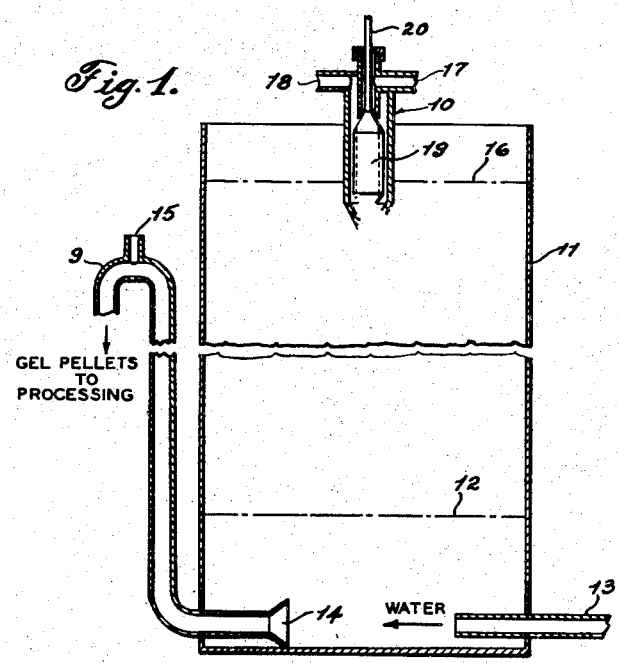
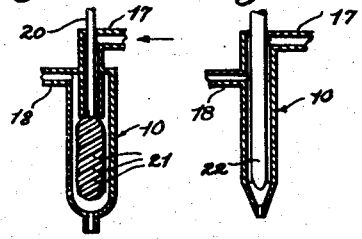
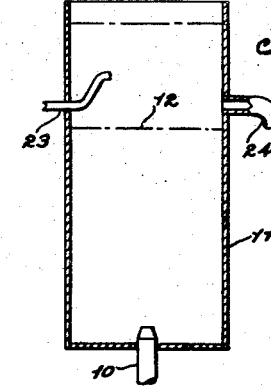
INVENTOR
Milton M. Marisic
BY *Oswald F. Hayes*
ATTORNEY Patented Mar. 1, 1949

2,463,467

UNITED STATES PATENT OFFICE 2,463,467

PREPARATION OF SPHEROIDAL AEROGEL PELLETS

Milton M. Marisic, Northfield, Ill., assignor to Socony-Vacuum Oil Company, Incorporated, a corporation of New York Application September 8, 1945, Serial No. 615,129

8 Claims. (Cl. 252—317)

This invention relates to aerogels and is specifically directed to a process for preparing aerogels in a novel form having comparatively high strength. This application is a continuation-in-part of my copending application Serial No. 590,071, filed April 24, 1945, now patent Number 2,384,946, issued September 18, 1945.

The aerogels are prepared from hydrogels of inorganic oxides such as silica, alumina, titania, beryllia, and others as well as from combinations of one or more oxides by replacing the aqueous phase of the hydrogel with an organic liquid and then removing the organic liquid at a temperature above the critical. At such temperatures, no meniscus is formed and the gel is therefore dried without shrinkage leaving a dried gel of the same volume as the hydrogel. The aerogels known heretofore have been extremely weak and thus incapable of practical use in large size pieces. This has limited the usefulness of the product to those applications where powders are suitable.

According to the present invention, smooth surfaced gel particles of generally spheroidal shape are dried by the aerogel technique to yield spheroidal particles of aerogel having substantial resistance to breakage by crushing and attrition.

The hydrogel spheroids are prepared by the process of my aforementioned copending application by causing a hydrosol to set to the corresponding hydrogel in a form assumed under the influence of surface tension against a fluid medium which is not miscible with the hydrosol. That medium may contain components which can be dissolved therefrom by the hydrosol but it must be of such character that a definite interface exists between the hydrosol and the fluid gelation medium which interface exists through the gelation thus causing the gel to form in a generally spheroidal shape having bounding surfaces corresponding to the interface. The shape of the hydrogel as set will vary greatly with a number of factors as discussed hereinafter but, in general, the hydrogel pellets and the dried gel pellets obtained by drying the hydrogel will be smooth surfaces made up of smooth curves. Such shapes are referred to herein as spheroids; that is, spheres or forms somewhat similar to spheres as oblate spheroids, prolate spheroids and the like. It is an important aspect of my invention that the hydrosol sets to a true hydrogel as distinguished from gelatinous precipitates. The latter are formless solid masses separating out from a liquid portion of the sol although they contain large portions of liquid. When true hydrogels are formed, the entire hydrosol sets to a firm mass which occupies all the space previously occupied by the sol although liquor may exude therefrom by syneresis.

The present compositions may include any of the oxides which will form true hydrogels and the final products may be used for the purposes to which aerogels are adapted such as thermal insulation. As compared with the extreme fragility of conventional aerogels, the present product will support considerable weight. For example, a typical spheroid of about one-half inch diameter normally supports weights in excess of fifty grams, up to about one hundred grams. The aerogel spheroids do not break on impact but may be thrown with considerable force against flat surfaces, from which they rebound like rubber balls. The smooth surfaces of the spheroids insure against deterioration by attrition.

It is therefore a primary object of this invention to provide aerogels in a form having physical and mechanical properties which make it possible to use pieces of aerogel greater in size than powder particles.

The above-mentioned process of forming the pellets involves continuously contacting within an enclosed mixing chamber such as an injector or nozzle mixer, streams of reactant solutions of such concentrations and proportions that no gelation occurs within the mixer, but only at some predetermined time after leaving the mixer, and under such conditions of flow that each stream is completely and uniformly dispersed within and throughout the other at the instant of contact. The resultant colloidal solution is ejected from the mixer through an orifice or orifices of suitable size so as to form globules of the solution which are introduced into a fluid medium where the globules of the colloidal solution set to a gel before they pass out of that medium. The fluid medium may be any liquid or combination of liquids which is immiscible with water such as, for example, petroleum naphtha, kerosene, hydrocarbon oils, etc. Pellets may also be formed by a process analogous to spray drying wherein the gelable solution is sprayed into a drying tower under conditions such that the particles of the solution set to a gel and are dried to about 10% to 50% water content. This process is claimed in my application Serial No. 461,453, filed October 9, 1942 (now abandoned). The fluid medium may also be constituted of a gas such as air. Whether the fluid medium be gaseous or liquid, it is essential to the formation of a structurally strong pellet that the sol be not mechanically disturbed during the time of setting. Evaporation of water in the sol tends to generate steam which not only mechanically disturbs the gel structure during formation but also introduces gas bubbles of large size compared with the size of the pellet. The fluid medium should therefore be maintained at a temperature below the boiling point of the sol until the same has set to a firm hydrogel.

After setting is complete, the hydrogel may be washed, base exchanged, heat treated or otherwise processed to obtain the desired physical and chemical characteristics in the final product. Care is exercised, however, to avoid mechanical injury to the gel structure such as occurs in the conventional breaking up and/or milling of gels as manufactured prior to my invention. It will be seen therefore that the preferred embodiment of the invention involves maintaining the form of the material substantially constant from a time prior to gelation until after the gel has been dried.

There are two alternative methods of liquid phase operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away for processing.

The shapes of the formed gel are dependent upon the rate at which the globules of the colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence, the gel pellets will assume flat or disc-like shapes. Examples of liquids in which pellets of this type may be produced are benzene, carbon tetrachloride, or petroleum naphtha. A water-immiscible fluid medium having a high viscosity or a density close to that of the colloidal solution will effect slow movement of the globules of the latter solution and thus form spherically-shaped gel pellets. It is apparent from the above description that gel pellets of any shape, varying from flat-like discs to perfect spheres, may be manufactured by choice of a water-immiscible fluid medium having the proper density and viscosity.

The success of this process is due to the fact that the gelation time for a large number of materials can be controlled very accurately.

I have studied the preparation of many gels in which silica is the predominant component and found that the gelation time can be controlled so that the invention described above may be utilized in their preparation. The following is a list of the gels I have prepared by the methods described herein: silica gel, silica-alumina, silica-stannic oxide, silica-ceria, silica-thoria, silica-zirconia, silica-alumina-thoria, silica-alumina-zirconia, silica-alumina-stannic oxide, silica-alumina-ceria. Further, the methods described herein may be extended to the preparation of many other types of gels.

The time of gelation is dependent upon temperature, pH and concentrations of reactants. The higher the temperature, the shorter the time of gelation. At fixed concentrations of reactants the gelation time increases with decrease in pH provided the pH is within the limits of the invention. When the temperature and pH are constant, the gelation time decreases as the reactant solutions are made more concentrated. Considerations controlling gelation time are discussed in detail in my copending application Serial No. 461,455, filed October 9, 1942 (now abandoned).

Briefly, the invention contemplates an aerogel pellet of generally rounded outline having uniform porosity, a hard surface and unusually high crushing strength. These pellets are better suited to use as pellets than previously known aerogels because of their high resistance to breakdown in transportation and use; but their advantages are achieved to a very high degree when employed in uses involving constant exposure to forces tending to abrade and crush the pellets.

Other objects and advantages will be apparent from the detailed description below when considered in connection with the attached drawings wherein:

Figure 1 shows apparatus for use in preparing the catalyst;

Figures 2 and 3 show modified types of mixing nozzles for the apparatus of Figure 1;

Figure 4 is a modified type of apparatus for forming the pellets;

Figure 5 is an illustration of a group of pellets constituting the product claimed herein and showing the spheroidal shapes thereof.

Referring to Figure 1, a mixing nozzle, indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 and 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped onto the surface of the fluid, but this tends to break them and impairs control over pellet size obtained by injecting the colloidal solution under the surface of the liquid.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

Referring, now, to the operation of mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotor are grooved; thus, efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the velocities of the reactant solutions are so high that the time the latter solutions spend in the mixing chamber is only a very small fraction of the gelation time.

A further modification is the extremely simple mixer of Figure 3 wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

*Example I*

A solution of sodium silicate containing 105 grams of SiO₂ per liter was prepared by diluting "N" brand of sodium silicate (28.7% SiO₂, 8.9% Na₂O). This solution was mixed with a second solution containing 34.10 grams of Al₂(SO₄)₃ and 25.05 grams of H₂SO₄ per liter at the ratio of 1.00 volume of the former solution to 0.780 volume of the latter. The resulting colloidal solution leaving the mixer through orifices was introduced into the top of a column of gas oil at room temperature whose depth was eight feet. The globules of solution fell through the oil and gelled before passing into the layer of water located beneath the oil. The gel in the globular form was conducted out of the bottom of the column in a stream of water and on removal from the water, it was washed with petroleum naphtha to remove oil from its surface. It was then washed with water and screened through a ⅜ inch screen onto a 5/16 inch screen and 500 grams of the beads retained on the latter screen were placed in a 2-liter flask and covered with 500 cc. of denatured ethyl alcohol. The alcohol was drained and replaced with fresh alcohol four times at intervals of two days, after which the "alcogel" was transferred along with 100 cc. of the fourth exchange alcohol to a 3-liter pressure autoclave with a glass liner. The autoclave was heated to 540–560° F. after which the vaporized alcohol was slowly vented from about 1400 p. s. i. to atmospheric pressure at this same temperature. The autoclave was then evacuated at about 1 mm. of mercury pressure absolute for 90 minutes and the finished aerogel beads discharged from the autoclave.

The product so obtained was found to be of extremely low apparent density and consisted of spheroids having smooth surfaces which bounced readily and supported weights in excess of fifty grams without breakage.

The time of gelation for the concentrations and proportions of reactants given above was about ten seconds, while the pH was 6.9. The gas oil employed was a fraction of Oklahoma City gas oil having a boiling range of 471° to 708° F. and a specific gravity of 0.846.

*Example II*

This example illustrates the use of chlorobenzene as a fluid medium and the mixing of reactants at such concentrations and proportions that the gelation time was approximately twenty seconds while the pH was 6.9. Since chlorobenzene has a density of 1.101, the colloidal solution was ejected into the bottom of a ten foot column of chlorobenzene at room temperature (see Fig. 4), the globules of solution rose through the fluid and gelled before passing into a layer of water contained over the chlorobenzene. The gel was washed and dried as described in Example I (the washing with petroleum naphtha was unnecessary here).

The sodium silicate solution contained 105 grams of SiO₂ per liter (prepared from "N" brand sodium silicate) while the second solution contained 27.10 grams Al₂(SO₄)₃ and 19.95 grams of H₂SO₄ per liter. These solutions were mixed at a ratio of 1.00 volume of the former solution to 0.980 volume of the latter.

*Example III*

A water glass solution was prepared by diluting 27.40 pounds of "N" brand of sodium silicate with 17.68 pounds of water. This solution contained 212 grams of SiO₂ per liter and 66 grams of Na₂O per liter. A second solution was prepared by dissolving 387 grams of sodium aluminate in water to form ten liters of solution. These two solutions were mixed in batch form with efficient stirring in the ratio of 100 volumes of the former to 67.8 volumes of the latter.

The sodium aluminate-sodium silicate solution, immediately after preparation, was mixed in the nozzle mixer with a 1.224 normal hydrochloric acid in equal volumes to form a colloidal solution having a pH of 5.7 and a gelation time of three minutes at room temperature. The colloidal solution was extruded from the nozzle mixer into the top of a column of gas oil whose depth was twelve feet and which was maintained at a temperature of 95° C. The sol globules fell through the oil and gelled before passing into the layer of water located beneath the oil. Washing and drying of the hydrogel were conducted as described in Example I.

*Example IV*

The sodium aluminate-sodium silicate solution prepared as described in Example III was mixed in the nozzle mixer with a 3.780 normal hydrochloric acid solution in the ratio of 100 volumes of the former solution to 32.6 volumes of the acid solution to form a sol having a pH of 3.4 and a gelation time of two hours at room temperature. The colloidal solution leaving the mixing chamber was pumped through a preheater which consisted of a pipe twisted into a coil and immersed in a bath maintained at 70° C. The sol remained in the preheater for 120 seconds before being introduced, in the form of globules, at the top of a column of gas oil which was twelve feet deep and was maintained at a temperature of 95° C. The globules of the colloidal solution fell through the oil and gelled before passing into the layer of water located beneath the oil. The hydrogel pellets were washed and dried as described in Example I.

Example V

An acid solution was prepared by mixing 3.5 parts by weight of sulfuric acid (100% concentration), 7.9 parts by weight of commercial iron free aluminum sulfate containing 15 mols of water per mol of salt, and 88.6 parts by weight of distilled water. A dilute water glass solution was prepared by mixing 44.7 parts by weight of distilled water and 55.3 parts by weight of "N" brand sodium silicate (28.7% $SiO_2$, 8.9% $Na_2O$). These solutions were mixed in a nozzle mixer of the type shown in the drawings in the ratio of 137 volumes of acid to 150 volumes of water glass thus forming a sol which sets in less than one second to a firm hydrogel containing 10 grams of silica and alumina per 100 grams of gel. Immediately upon mixing, the sol was ejected at room temperature through an orifice into enlarged vessel containing air at room temperature. The spray thus formed set to small spheroids of hydrogel which were collected in a pool of water at the bottom and after removal were washed, base exchanged with 3% aluminum sulfate solution, again washed and dried as in the previous examples.

Example VI

Gels of varying degrees of apparent density may be prepared in accordance with my invention by partially drying the hydrogel under conditions to cause shrinkage prior to replacing the aqueous phase with an organic liquid and drying at a temperature equivalent to or above the critical for that liquid. When the hydrogel is dried below the critical point as in air, superheated steam, immersed in benzene or the like, the gel shrinks during drying. In the case of the hydrogel globules of Example I, the final dried product has about one-fourteenth the volume of the hydrogel if dried in air. I take advantage of this fact to make dried gels of intermediate apparent density.

The washed hydrogel globules of Example I were dried in a current of air at 250° F. until they had shrunk to about one-half their original volume. These partially shrunk hydrogel pellets were then immersed in alcohol and dried as in Example I, producing a gel having an apparent density about twice that of the product of Example I but otherwise similar thereto.

I claim:

1. The process of forming inorganic oxide aerogel pellets of high strength which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, replacing the aqueous phase of the hydrogel pellets with an organic liquid and thereafter evaporating said organic liquid at a temperature not below its critical temperature.

2. The process of forming inorganic oxide aerogel pellets which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs replacing the aqueous phase of the hydrogel with alcohol and thereafter evaporating said alcohol at a temperature not below its critical temperature.

3. The process of forming inorganic oxide aerogel pellets which comprises forming a hydrosol of inorganic oxide including silica characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, replacing the aqueous phase of the hydrogel pellets with an organic liquid and thereafter evaporating said organic liquid at a temperature not below its critical temperature.

4. The process of forming inorganic oxide aerogel pellets which comprises forming a hydrosol of inorganic oxide including silica and alumina characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, replacing the aqueous phase of the hydrogel pellets with an organic liquid and thereafter evaporating said organic liquid at a temperature not below its critical temperature.

5. The process of forming inorganic oxide aerogel pellets which comprises forming a hydrosol of inorganic oxide including silica and a metal oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, replacing the aqueous phase of the hydrogel pellets with an organic liquid and thereafter evaporating said organic liquid at a temperature not below its critical temperature.

6. The process of forming inorganic oxide aerogel pellets which comprises forming a hydrosol of inorganic oxide including silica and alumina characterized by an inherent capacity to set to a hydrogel upon the lapse of a suitable period of time without addition to or substraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the hydrogel spheroids with water to remove water soluble salts, replacing the aqueous phase of the hydrogel pellets with an organic liquid and thereafter evaporating said organic liquid at a temperature not below its critical temperature.

7. The process of forming inorganic oxide aerogel pellets which comprises forming a hydrosol of inorganic oxide including silica and a metal oxide characterized by an inherent capacity to set to a hydrogel upon the lapse of a suitable period of time without addition to or subtraction from said sol of any substance, admitting said sol in the form of separate globules to a body of a fluid medium substantially immiscible with water in which said globules assume spheroidal shape due to surface tension at the interface between said sol and said fluid medium, said medium being maintained at a temperature below the boiling point of said sol, retaining said spheroidal globules in said medium until gelation occurs, retaining in said globules substantially all the constituents of said sol until gelation occurs, washing the hydrogel spheroids with water to remove water soluble salts, replacing the aqueous phase of the hydrogel pellets with an organic liquid and thereafter evaporating said organic liquid at a temperature not below its critical temperature.

8. The process of forming inorganic oxide aerogel pellets which comprises forming a hydrosol of inorganic oxide characterized by an inherent capacity to set to a hydrogel upon the lapse of a suitable period of time without addition to or subtraction from said sol of any substance, admitting said sol in the form of separate globules to a body of a liquid medium substantially immiscible with water in which said globules assume spheroidal shape due to surface tension at the interface between said sol and said liquid medium, said medium being maintained at a temperature below the boiling point of said sol, retaining said spheroidal globules in said medium until gelation occurs, retaining in said globules substantially all the constituents of said sol until gelation occurs, washing the spheroidal hydrogel, partially drying the washed hydrogel in air until the globules shrink to about half the volume thereof at the time of gelation, replacing the aqueous phase of the hydrogel pellets with an organic liquid and thereafter evaporating said organic liquid at a temperature not below its critical temperature.

MILTON M. MARISIC.

REFERENCES CITED

The following references are of record in the file of this patent:

UNITED STATES PATENTS

| Number | Name | Date |
| --- | --- | --- |
| 2,093,454 | Kistler | Sept. 21, 1937 |
| 2,384,946 | Marisic | Sept. 18, 1945 |